United States Patent
Juichi

[11] 3,797,898
[45] Mar. 19, 1974

[54] SHAFT BEARING-AND-SEALING DEVICE
[75] Inventor: Morishima Juichi, Kawasaki, Japan
[73] Assignee: Fuji Denki Seizo Kabushiki Kaisha, Kanagawa-ken, Japan
[22] Filed: Nov. 6, 1972
[21] Appl. No.: 303,716

[52] U.S. Cl. .............................................. 308/187
[51] Int. Cl. .......................................... F16c 33/66
[58] Field of Search .................................. 308/187

[56] References Cited
UNITED STATES PATENTS
2,255,662  9/1941  Gulow ................................ 308/187

Primary Examiner—Charles J. Myhre
Assistant Examiner—Frank Susko
Attorney, Agent, or Firm—Holman & Stern

[57] ABSTRACT

A shaft bearing-and-sealing device of simple construction for the rotary machines such as an electric motor and the like which assures reliable and positive oil sealing function, having a suction fan installed in an axially inner position further inward than the bearing for applying suction to the lubricating oil so as to prevent the oil from leaking out from around the shaft bearing members. This device is readily applicable to and combined with the conventional shaft bearing construction incorporating an oil lubricating an oil lubricating system simply by providing a disc on the output shaft with a larger outer diameter than that of the inner race of the bearing for the purpose of preventing oil leakage cooperatively with the suction fan.

7 Claims, 2 Drawing Figures

SHAFT BEARING-AND-SEALING DEVICE

BACKGROUND OF THE INVENTION

This invention relates to the field of shaft bearing-and-sealing systems and particularly to a new and improved shaft seal-ing system under lubrication which can be versatilely adapted for the purpose of providing an oil sealing means of simple, inexpensive, yet reliable construction. More particularly, the present invention concerns a shaft-bearing-and-sealing device which is specifically designed with a simple construction of high reliability with a positive oil sealing effect due to a suction fan which is installed inward of the bearing mount for inducing the lubricating oil into a position required for lubrication in order to positively prevent the lubricating oil from leaking out from around the bearing members. In addition, there is provided a disc of larger outer diameter than that of the bearing inner race secured to the rotor shaft axially outside the bearing in order to provide a cooperative oil sealing effect.

In ball-and-roller bearing means which heretofore have been applied to rotary machines such as an electric motor and the like designed for operation at high temperatures or at extra-high rotational speeds, or designed with larger diameter construction, it is the most common and established practice to apply oil lubrication techniques such as oil dripping lubrication, sprayed oil lubraction, and the like. The shaft sealing construction for such lubrication systems, however, has been considerably expensive and complicated in construction or inadequate in performance and durability.

Consequently, there has long been a great demand for the realization of an oil sealing construction which provides positive and reliable oil-sealing performance.

SUMMARY OF THE INVENTION

It is an object of the present invention to provide a shaft sealing device of simple, inexpensive, and reliable construction wherein the difficulties inherent to the conventional shaft sealing construction have been overcome. According to the invention, briefly summarized, there is provided, in a rotary machine, a shaft sealing device which comprises, in combination: an antifriction bearing means having an inner race for rotatably supporting a shaft; a plurality of fan blades disposed axially inward of said bearing means and adapted to rotate as a unit with the shaft; an oil lubricating means for supplying the bearing means with lubrication oil from a part axially outward of the bearing; a pair of oil draining tubes provided at the bottom part of the rotary machine and in a position axially inward of the bearing; and a disc having a flanged portion of a larger diameter than that of the bearing inner race and secured to the rotor shaft at a position further out than the shaft bearing means and further out than the lubricated part of said bearing members.

BRIEF DESCRIPTION OF THE DRAWING

The foregoing and other objects, characteristics and advantages of the invention will be more fully understandable from the following detailed description of preferred embodiments thereof, when read with reference to the accompanying drawing, in which.

DETAILED DESCRIPTION

Figure 1:
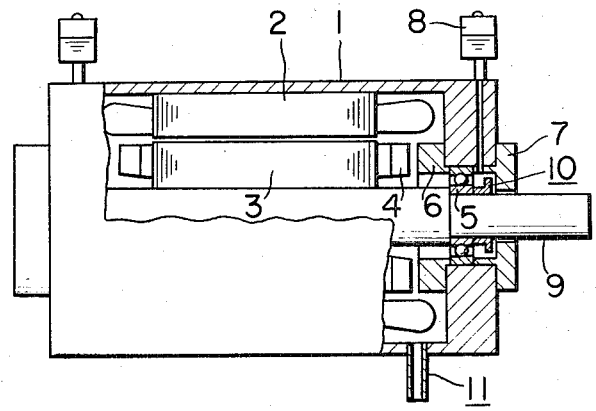
FIG. 1 is a side elevation, for the most part in longitudinal section, showing an example of the shaft sealing device embodying the invention.

The construction and operation of a shaft sealing device according to the invention will now be described with respect to one example of application in conjunction with the accompanying drawing. Referring to FIG. 1, the electric motor of enclosed ventilated type shown therein incorporates, in conventional arrangement, a casing 1 which houses a stator 2 in the interior thereof and a rotor 3 rigidly mounted on a straight through shaft 9. At each end of the motor, there are further provided a plurality of cooling fan blades 4 which may be mounted either compositely on the end surfaces of the rotor or separately and independently on the shaft 9 so as to rotate together with the shaft rotatably supported on a shaft bearing 5. Also provided are an air guide 6 disposed adjacently to the cooling fan and functioning additionally to fix the bearing and a bearing securing end plate 7.

At each end of the electric motor, there are further provided oil supply means 8 such as an oil cup or the like at each shaft bearing, a disc 10 of a larger outer diameter than that of the bearing inner race which disc is located axially outside of the lubricated portion, and an oil drain tube 11. Further detailed illustration which respect to the construction and the mutual relationships of the components will be better understood from a reference to the enlarged view of FIG. 2.

An improved feature of the construction of the shaft bearing device according to this invention is as follows with reference to either FIG. 1 or FIG. 2. In the conventional construction of the oil lubricating system, while the lubricating oil dripping from the oil supply means down to the rotor shaft will be centrifugally flung out from the shaft surface, a major part of the oil will properly be fed to lubricate the bearings of the motor. However, it is inevitable that a minor part of the oil will occasionally escape out of the bearing members and axially outward.

Figure 2:
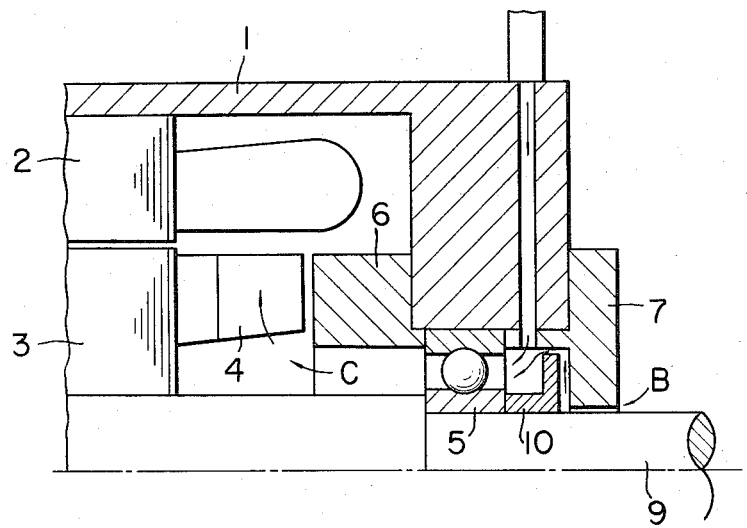
FIG. 2 is an enlarged fragmentary side view, in longitudinal section, showing certain members shown in FIG. 1.

In contrast, with the shaft sealing device of this invention in such an ordinary lubricating system, there is produced a negative air pressure in a space C within the motor casing 1, differing from the atmospheric pressure B outside the motor casing, by the cooling fan 4 which rotates integrally with the rotor shaft 9 so as to cause an air flow to be induced into the motor casing 1 from the outside through an annular gap constituted between the bore of the bearing securing end plate 7 and the rotor shaft 9 as indicated by an arrow in FIG. 2. By this function of the air flow induced into the motor casing 1, there occurs a positive action to prevent the lubricating oil from leaking out of the bearing members by entraining oil particles or mist in the above mentioned air flow. Incidentally, there is a secondary effect expected of the shaft sealing device to forcibly intake the lubricating oil or mist as positive lubricating means into the bearing members of the motor.

On the other hand, by means of the oil drain tube 11 provided at the bottom of the motor casing 1 to be connected to an outside oil sump or the like (not shown), the lubricating oil can effectively be recovered, and this function also prevents, cooperatively with the related members, oil leakage out of the shaft bearing members. Furthermore, the air flow positively inducing the lubrication oil has a derivative cooling effect on the bearings of the motor. Therefore, the shaft sealing device of the above described construction provides inexpensive but highly reliable lubrication means as well as shaft sealing means.

A further advantageous feature of the shaft sealing device according to the invention is that by virtue of the above described construction, there is no need for the use of any conventional sealing means such as a labyrinth, oil seal, etc.. Therefore, the shaft sealing construction according to this invention may be effectively and widely applied to such severe operating conditions as high temperatures and extra-high rotational speeds, while assuring trouble-free and stable operation.

While the fan blades in the above described example are fixed to the rotor, they can be fixed to the shaft or to both the rotor and the shaft.

Furthermore, while not indicated in the foregoing disclosure or illustrated in the drawing, means such as a pump can be connected to each oil drain pipe to recirculate the lubricating oil to the oil supply means, preferably by way of an oil filter.

I claim:

1. In a rotary machine of the type having a casing, a rotary member adapted to rotate within the casing, a shaft coaxially supporting the rotary member and extending at its ends through and out of the casing wall, an antifriction bearing having an inner race and rotatably supporting the shaft at each part thereof extending through the casing wall, and means for supplying a fluid lubricant to each bearing, the improvement wherein: fan blades are fixed to at least one rotating part within the casing at positions axially inward of each bearing and rotate with said rotating part to create a negative pressure on the inward side of that bearing and thereby to prevent the lubricant from leaking to the outside; the lubricant is thus supplied to each bearing at a point on the axially outer side of that bearing; a disc having an outer diameter greater than that of said inner race is fixed coaxially to the shaft at a position axially outside of said point of lubricant supply; and lubricant draining means are provided below and axially inward of each bearing to drain lubricant which has seeped past that bearing into the casing.

2. The improvement as claimed in claim 1 in which the fan blades are fixed to the rotating member.

3. The improvement as claimed in claim 1 in which the fan blades are fixed to the shaft.

4. The improvement as claimed in claim 1 in which the fan blades are fixed to the rotating member and the shaft.

5. The improvement as claimed in claim 1 in which an air guide means is provided to increase the effectiveness of the operation of the fan blades.

6. The improvement as claimed in claim 1 in which an end cover plate is disposed around the shaft with clearance therebetween at a position axially outside of each disc and is fixed to the outer surface of the casing.

7. The improvement as claimed in claim 1 in which means are further provided to recirculate the lubricant from the lubricant draining means to the means for supplying the lubricant.

* * * * *

UNITED STATES PATENT OFFICE
CERTIFICATE OF CORRECTION

Patent No. 3797898    Dated March 19, 1974

Inventor(s) Juichi Morishima

It is certified that error appears in the above-identified patent and that said Letters Patent are hereby corrected as shown below:

[30] Foreign Application Priority Data

December 10, 1973   Japan Utility Application No.103086/1971

Signed and sealed this 24th day of September 1974.

(SEAL)
Attest:

McCOY M. GIBSON JR.          C. MARSHALL DANN
Attesting Officer            Commissioner of Patents